United States Patent
Sawada et al.

(10) Patent No.: US 7,437,968 B2
(45) Date of Patent: Oct. 21, 2008

(54) STEERING COLUMN DEVICE

(75) Inventors: Naoki Sawada, Maebashi (JP); Masaki Nishioka, Maebashi (JP); Kenji Sato, Maebashi (JP)

(73) Assignee: NSK Ltd., Tokyo (JP)

( * ) Notice: Subject to any disclaimer, the term of this patent is extended or adjusted under 35 U.S.C. 154(b) by 720 days.

(21) Appl. No.: 10/528,615

(22) PCT Filed: Oct. 2, 2003

(86) PCT No.: PCT/JP03/12655

§ 371 (c)(1),
(2), (4) Date: Mar. 21, 2005

(87) PCT Pub. No.: WO2004/031018

PCT Pub. Date: Apr. 15, 2004

(65) Prior Publication Data

US 2006/0053935 A1    Mar. 16, 2006

(30) Foreign Application Priority Data

Oct. 4, 2002   (JP) ............................. 2002-292146

(51) Int. Cl.
*B62D 1/18* (2006.01)
(52) U.S. Cl. ............................. 74/493; 74/492; 280/775
(58) Field of Classification Search .................. 74/492, 74/493; 280/775
See application file for complete search history.

(56) References Cited

U.S. PATENT DOCUMENTS 6,357,317 B1   3/2002   Livengood et al. ............ 74/493

FOREIGN PATENT DOCUMENTS

| DE | 85 28 941.8 U1 | 7/1989 |
|---|---|---|
| DE | 197 37 035 A1 | 3/1999 |
| EP | 0 721 875 A1 | 7/1996 |
| GB | 2 298 261 A | 8/1996 |
| JP | 55-91371 U | 6/1980 |
| JP | 63-30605 Y2 | 8/1988 |
| JP | 5-1654 U | 1/1993 |
| JP | 8-276852 A | 10/1996 |
| JP | 8-295202 A | 11/1996 |
| JP | 10-7003 A | 1/1998 |
| JP | 11-29050 A | 2/1999 |
| JP | 2001-50268 A | 2/2001 |
| WO | WO 90/05082 A1 | 5/1990 |
| WO | WO 96/15932 A1 | 5/1996 |

OTHER PUBLICATIONS

Supplemental European Search Report dated Nov. 2, 2006, for counterpart European Application No. EP 03 75 3992.

*Primary Examiner*—David M Fenstermacher
(74) *Attorney, Agent, or Firm*—Sidley Austin LLP

(57) ABSTRACT

A steering column device (1), comprising a column body (2) having a swelled shell part (23) in deformed section swelled in the side direction of a steering shaft (3) beyond the portion of thereof where an upper bearing (31) is installed and having opposed walls parallel with each other, wherein a lower body mounting part (22) and an upper body mounting part (21) are formed in the swelled shell part (23), whereby a distance bracket and a lower bracket must not be prepared and fixedly positioned on the column body.

11 Claims, 9 Drawing Sheets

STEERING COLUMN DEVICE

RELATED APPLICATIONS

This application is the National Stage of International Application No. PCT/JP2003/012655, the filing date thereof being Oct. 2, 2003 and the priority date being Oct. 4, 2002, the entire contents of which are incorporated herein by reference.

TECHNICAL FIELD

The present invention relates to a steering column device for a vehicle.

BACKGROUND ART

A steering column device is placed in a space for a driver's seat, between a meter panel provided above and a room for driver's knees provided below. The steering column device is equipped with a steering shaft, a steering wheel being mounted on the top end of the steering shaft and the lower end thereof being coupled to a vehicle body steering mechanism for controlling orientations of front wheels.

FIG. 1 shows a conventional steering column device 1. Generally, this steering column device 1 includes a tubular shaped column body 2 and a steering shaft 3 which penetrates inside the column body 2. The steering shaft 3 is rotatably supported by an upper bearing 31 and a lower bearing 32, which are respectively provided in proximity to both ends of the column body 2. A steering wheel, not illustrated, is coupled with one end thereof (in the right side in FIG. 1(A)), and the other end thereof (in the left side in FIG. 1(A)) is connected to a steering mechanism on the vehicle body side via an intermediate shaft.

The column body 2 is provided with an upper body mounting part 21 and a lower body mounting part 22, respectively on the two points along the longitudinal direction of the column body 2. The upper body mounting part 21 and the lower body mounting part 22 are respectively provided with a distance bracket 21d and a lower bracket 22t, each being U-shaped member having a flat bottom with a pair of feet 212 and a pair of feet 222, respectively, each of the pairs having feet parallel to each other and the tip ends of those feet being welded onto the column body 2.

On the vehicle body 9 side, a vehicle body side upper mounting part 91 and a vehicle body side lower mounting part 92 are fixed onto the positions corresponding to the distance bracket 21d and the lower bracket 22t respectively. The vehicle body side upper mounting part 91 and the vehicle body side lower mounting part 92 respectively have a pair of feet 912 and a pair of feet 922, each having an inner width into which an outer width of the distance bracket 21d and the lower bracket 22t are respectively placed suitably. The vehicle body side upper mounting part 91 is fixed onto the vehicle body 9 via an impact fracture member 913.

Each of the feet 912 of the vehicle body side upper mounting part 91 and the feet 212 of the distance bracket 21d are provided with mounting holes and a vehicle body side upper holding shaft member 911 penetrates into the mounting holes. The vehicle body side upper holding shaft member 911 is designed to hold the distance bracket 21d fitted between the feet 912 in tightened manner, by a cam member on which a column rock lever 93 is fixed and a cam member which is slidable along arc-shaped long holes 914 of the feet 912. The mounting holes provided on the feet 912 are arc-shaped long holes 914 made on an arc having as a center the vehicle body side lower holding shaft member 921 (described below) that servers as a tilt center. With this configuration, the column body 2 (that is, steering shaft 3 and steering wheel) can be tilted.

The feet 922 of the vehicle body lower mounting part 92 and the feet 222 of the lower bracket 22t are each provided with mounting holes and the vehicle body side lower holding shaft member 921 penetrates into the mounting holes. An ordinary bolt, a rivet pin or the like is employed as the vehicle body side lower holding shaft member 921. If it is a bolt, the member is fitted between the feet 922 by a bolt and nut being screwed together. If it is a rivet pin, the lower bracket 22t is rotatably supported by crimping the rivet pin, which penetrates into the feet 922 simultaneously with the lower bracket 22t fitted therebetween.

The mounting holes provided on the feet 922 of the vehicle body side lower mounting part 92 are open downwardly from the vehicle body (hereinafter, referred to as "lateral open hole 923"), and a shaft part of the vehicle body side upper holding shaft member 911 can escape therefrom. In the case of vehicle collision, if a driver comes into collision with the steering wheel due to abrupt speed reduction, thereby applying a downward force (left direction in FIG. 1) onto the steering shaft 3 and column body 2, the shaft part of the vehicle body side lower holding shaft member 921 escapes from the lateral open hole 923, and simultaneously the impact fracture member 913 is broken. Accordingly, a damage the driver may suffer will be reduced.

As described above, the conventional type steering column device 1 has been configured such that the distance bracket 21d and the lower bracket 22t are separately made in advance, and they are mounted on the column body by welding. Therefore, not only steps for making the distance bracket 21d and the lower bracket 22t are respectively required, as well as a welding step and the like for fixedly positioning these elements onto the column body, but also quality control for welding is a significant issue, and thus cost reduction has not been achieved as intended.

In addition, a tubular member is employed as it is to make the column body 2. If a need arises to improve undesirable operability such as vibrations propagating up to the steering wheel due to vibrations originating from the vehicle body, a technique for improving flexural rigidity and resistance to vibration property of the steering column is applied by making thicker the tubular member, as a material of the column body 2, or by reinforcing constitutional elements of the upper body mounting part 21 and the lower body mounting part 22. However, there is a problem that an increase in weight cannot be avoided.

Furthermore, in some vehicles, due to a vibration property, a vibration level which is acceptable by the steering column device is different between in the vertical direction with respect to the vehicle traveling direction (vibrations such as shaking the wheel up and down when viewed from the driver, referred to as "vertical direction" here), and in horizontal direction (vibrations such as shaking the wheel from side to side), and there may be a case that a heavily high rigidity is required in the vertical direction, rather than the horizontal direction.

If a tubular member is employed as it is for the column device like conventional manner, it is substantially difficult to vary the flexural rigidity and directionality in vibration level. Therefore, a possible countermeasure is only to make the wall thicker, thereby rendering the flexural rigidity and vibration property in horizontal direction also unnecessarily enhanced, even if it is not a significant requirement. It is needless to say that in the case above, the weight is increased and thus reversing the trend.

Furthermore, there is a type of steering column device which has a steering lock unit being mounted on the upper part thereof, and in this type of steering column device, natural vibration frequency of the column body is relatively reduced due to the mass of the steering lock unit. Accordingly, the natural vibration frequency of the steering column device approaches to the vibration frequency of the vehicle body, and resonance may be easily established. Therefore, the above problem becomes further critical.

DISCLOSURE OF THE INVENTION

The steering column device according to the present invention comprises a hollow column body, an upper bearing and a lower bearing provided inside the column body, a steering shaft being rotatably supported by the upper bearing and the lower bearing, having a steering wheel being mounted on the upper end thereof and a vehicle body steering mechanism being coupled with the lower end thereof, a lower body mounting part formed in the lower part side of the column body so that the column body is supported in a tilted manner with respect to the vehicle body, and an upper body mounting part formed in the upper part side of the column body so that the column body is supported in a tilted manner with respect to the vehicle body, wherein the column body has a shape more swelled laterally from the steering shaft than a portion where the upper bearing is provided, having a swelled shell part of deformed cross section with opposed walls parallel to each other, and the lower body mounting part and the upper body mounting part are formed on this swelled shell part.

Another aspect of the invention is directed to the steering column device, wherein the swelled shell part has a shape smoothly swelled from a portion where the upper bearing is provided.

Another aspect of the invention is directed to the steering column device, wherein the lower body mounting part and the upper body mounting part comprise lower body mounting holes and upper body mounting holes respectively, each on the opposed walls, allowing the holding shaft members on the vehicle body side to penetrate therein.

Another aspect of the invention is directed to the steering column device, characterized in that the lower body mounting holes and the upper body mounting holes are long holes along the longitudinal direction of the column body.

Another aspect of the invention is directed to the steering column device, characterized in that a steering lock unit is fixed on the swelled shell part.

Further in the steering column device, the steering lock unit is characterized in being fixed closer to the steering wheel side than the upper body mounting part.

Another aspect of the invention is directed to the steering column device according to the first embodiment, characterized in that the swelled shell part has a swelled portion from a position in the proximity of the lower body mounting part being continuous to a position in the proximity of the upper body mounting part.

Another aspect of the invention is directed to the steering column device according to the first embodiment, characterized in that the swelled shell part has two separate portions, a lower swelled shell part including a portion in the proximity of the lower body mounting part and an upper swelled shell part including a portion in the proximity of the upper body mounting part.

Another aspect of the invention is directed to the steering column device according to the first embodiment, characterized in that the lower bearing is provided on the swelled shell part, and the lower bearing is provided on the swelled shell part via a spacer member.

Another aspect of the invention is directed to the steering column device according to the above embodiments, characterized in that the spacer member is made of resin with a favorable vibrational absorption property or an elastic member such as rubber.

Another aspect of the invention is directed to the steering column device according to the first embodiment of the invention, characterized in that the lower bearing is directly mounted on the bottom edge of the column body adjacent to the swelled shell part.

It is to be noted that the term "swelled" used in the present specification denotes a status that a dimension is larger than a part which is not swelled. Therefore, it does not mean a change in time-wise or a processing sequence, such as expanding a thing initially having a small dimension, or vise versa.

According to the present invention, it is possible to eliminate steps for fabricating a distance bracket and a lower bracket, to be prepared separately, a welding step for fixedly positioning those elements onto the column body, and a quality control therefor, whereby a product cost can be reduced. Furthermore, in this steering column device, a swelled shell part with a deformed cross section is provided on the column body, thereby improving flexural rigidity and resistance to vibration property in the longitudinal direction. Further in a type of steering column device having a steering lock unit being mounted on the upper portion thereof, a reduction of natural vibration frequency, which is relatively caused by the mass of the steering lock unit, can be suppressed by providing the swelled shell part, whereby it is possible for the steering column device or the column body to become resistant to resonance, without increasing weight of the column body, and thus a deterioration in steering operability can be prevented.

BRIEF DESCRIPTION OF DRAWINGS

FIG. 1(A) is a side view of the steering column body 1, FIG. 1(B) and FIG. 1(C) are respectively a cross sectional view taken along B-B and a cross sectional view taken along C-C, relating to FIG. 1(A).

FIG. 2(A) is a side view of the steering column body 1, FIG. 2(B), FIG. 2(C) and FIG. 2(D) are respectively across sectional view taken along B-B and, a cross sectional view taken along C-C, and a cross sectional view taken along D-D relating to FIG. 2(A).

FIG. 3(A) is a partially notched side view of the column body 2, and FIG. 3(B) is a cross sectional view taken along B-B of FIG. 3(A).

FIG. 5(A) is a side view thereof, and FIG. 5(B) is a cross sectional view taken along B-B of FIG. 5(A).

FIG. 6(A) is a side view thereof, and FIG. 6(B) is a cross sectional view taken along B-B of FIG. 6(A).

BEST MODE FOR CARRYING OUT THE INVENTION

Figure 1:
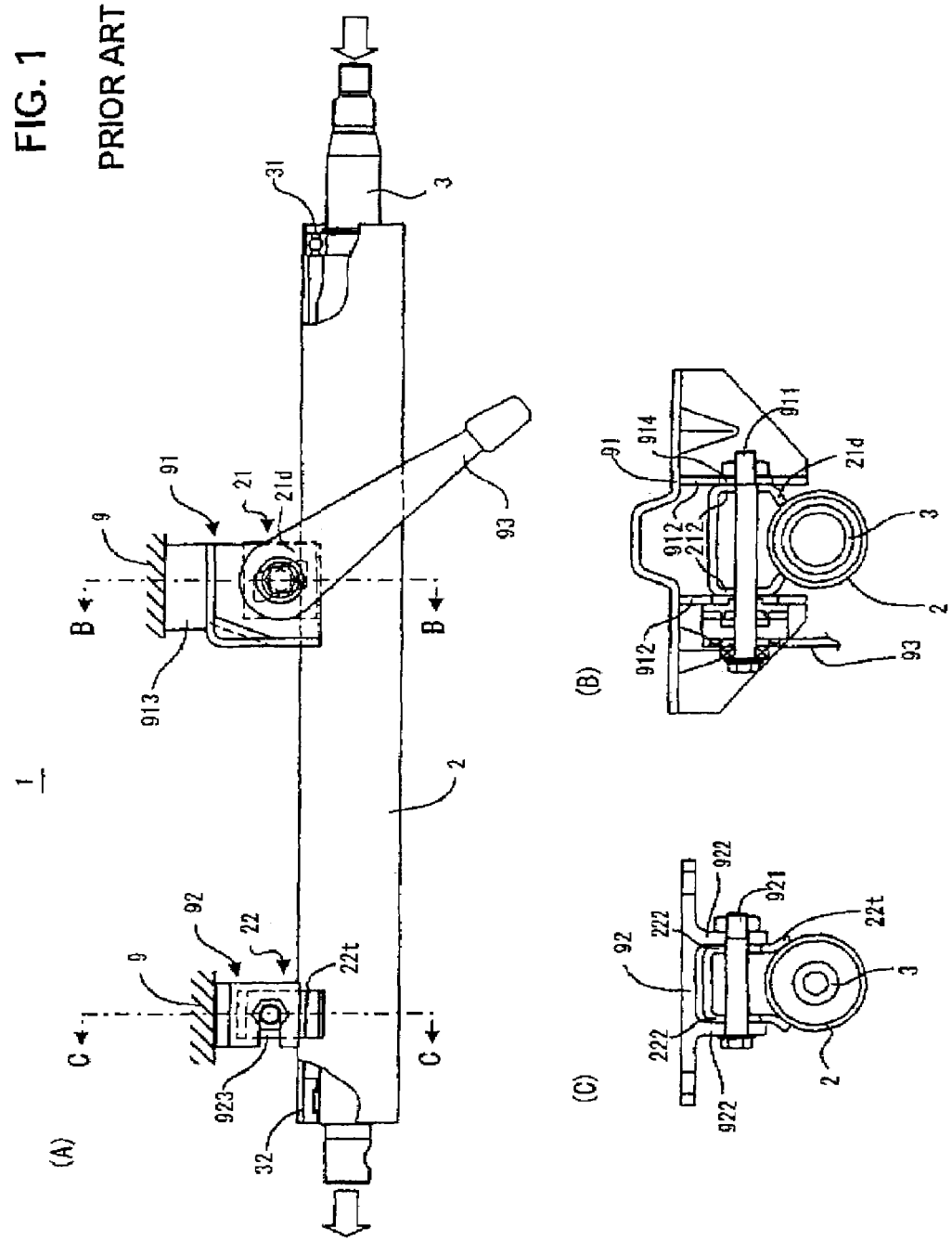
FIG. 1 is an explanatory diagram showing a conventional steering column body 1.

Hereinafter, preferred embodiments of the present invention will be explained.

First Embodiment

The steering column device 1 includes a tubular shaped column body 2 having a swelled shell part 23 and a steering shaft 3 which penetrates inside the column body 2. The steering shaft 3 is rotatably supported by an upper bearing 31 and a lower bearing 32, which are respectively provided at both ends of the column body 2. A steering wheel, not illustrated is coupled with one end thereof (in the right side in FIG. 2(A)), and the other end thereof (in the left side in FIG. 2(A)) is connected to a vehicle steering mechanism via an intermediate shaft.

The swelled shell part 23 is provided with an upper body mounting part 21 and a lower body mounting part 22, respectively on the two points along the longitudinal direction of the column body 2. On the vehicle body 9 side, a vehicle body side upper mounting part 91 and a vehicle body side lower mounting part 92 are respectively fixed on the positions corresponding to the upper body mounting part 21 and the lower body mounting part 22. The vehicle body side upper mounting part 91 and the vehicle body side lower mounting part 92 are respectively provided with a pair of feet 912 and a pair of feet 922, and the swelled shell part 23 can be accommodated suitably between those feet. The vehicle side upper installation 91 is fixed on the vehicle body 9 via an impact fracture member 913.

Each of the feet 912 of the vehicle body upper mounting part 91 and the upper body mounting part 21 are provided with mounting holes, and a vehicle body side upper holding shaft member 911 penetrates into the mounting holes. The vehicle body side upper holding shaft member 911 is designed to hold the upper body mounting part 21 fitted between the feet 912 in tightened manner, by a cam member on which a column lock lever 93 is fixed and a cam member which is slidable along an arc-shaped long hole 914 of the feet 912. The mounting holes provided on the feet 912 are arc-shaped long holes 914 made on an arc having as a center the vehicle body side lower holding shaft member 921 (described below) that servers as a tilt center. With this configuration and the vehicle side lower holding shaft member 921 in the following, the column body 2 (that is, steering shaft 3 and steering wheel) can be tilted and secured.

The feet 922 of the vehicle body side lower mounting part 92 and the lower body mounting part 22 are each provided with mounting holes and a vehicle body side lower holding shaft member 921 penetrates into the mounting holes. An ordinary bolt, a rivet pin or the like is employed as the vehicle body side lower holding shaft member 921. If it is a bolt, the member is fitted between the feet 922 by a bolt and nut being screwed together. If it is a rivet pin, the lower bracket 22t is rotatably supported by crimping the rivet pin, which penetrates into the feet 922 simultaneously with the lower bracket 22t fitted therebetween.

The mounting holes provided on the feet 922 of the vehicle body side lower mounting part 92 are open downwardly from the vehicle body (hereinafter, referred to as "lateral open hole 923"), and a shaft part of the vehicle body side upper holding shaft member 911 can escape therefrom. In the case of vehicle collision, if a driver comes into collision with the steering wheel due to abrupt speed reduction, thereby applying a downward force (left direction in FIG. 2(A)) onto the steering shaft 3 and column body 2, the shaft part of the vehicle body side lower holding shaft member 921 escapes from the lateral open hole 923, simultaneously the impact fracture member 913 being broken, and then the steering column device 1 makes an escape. Accordingly, a damage the driver may suffer will be reduced.

Figure 2:
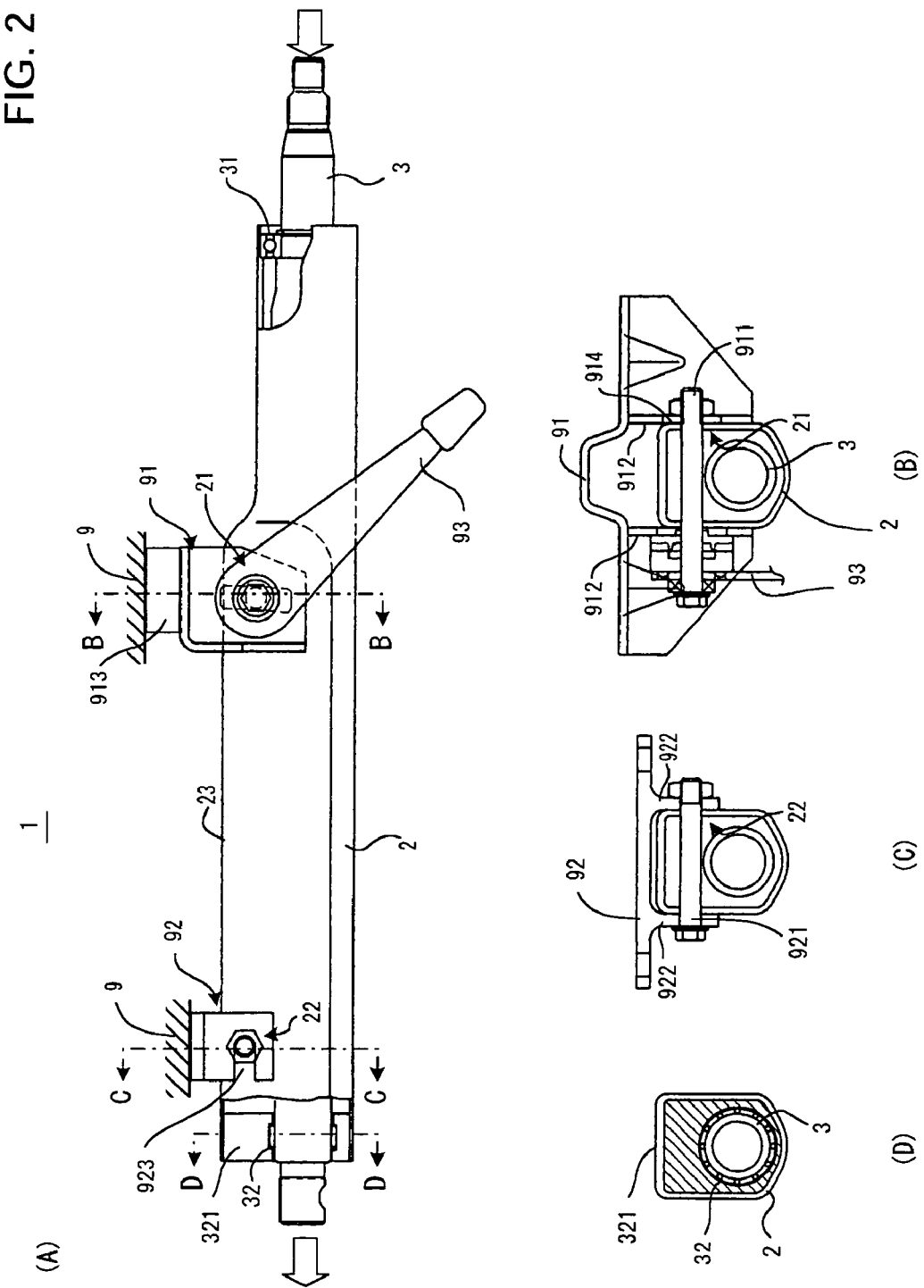
FIG. 2 is an explanatory diagram showing a steering column body 1 (first embodiment) according to the present invention.
Figure 3:
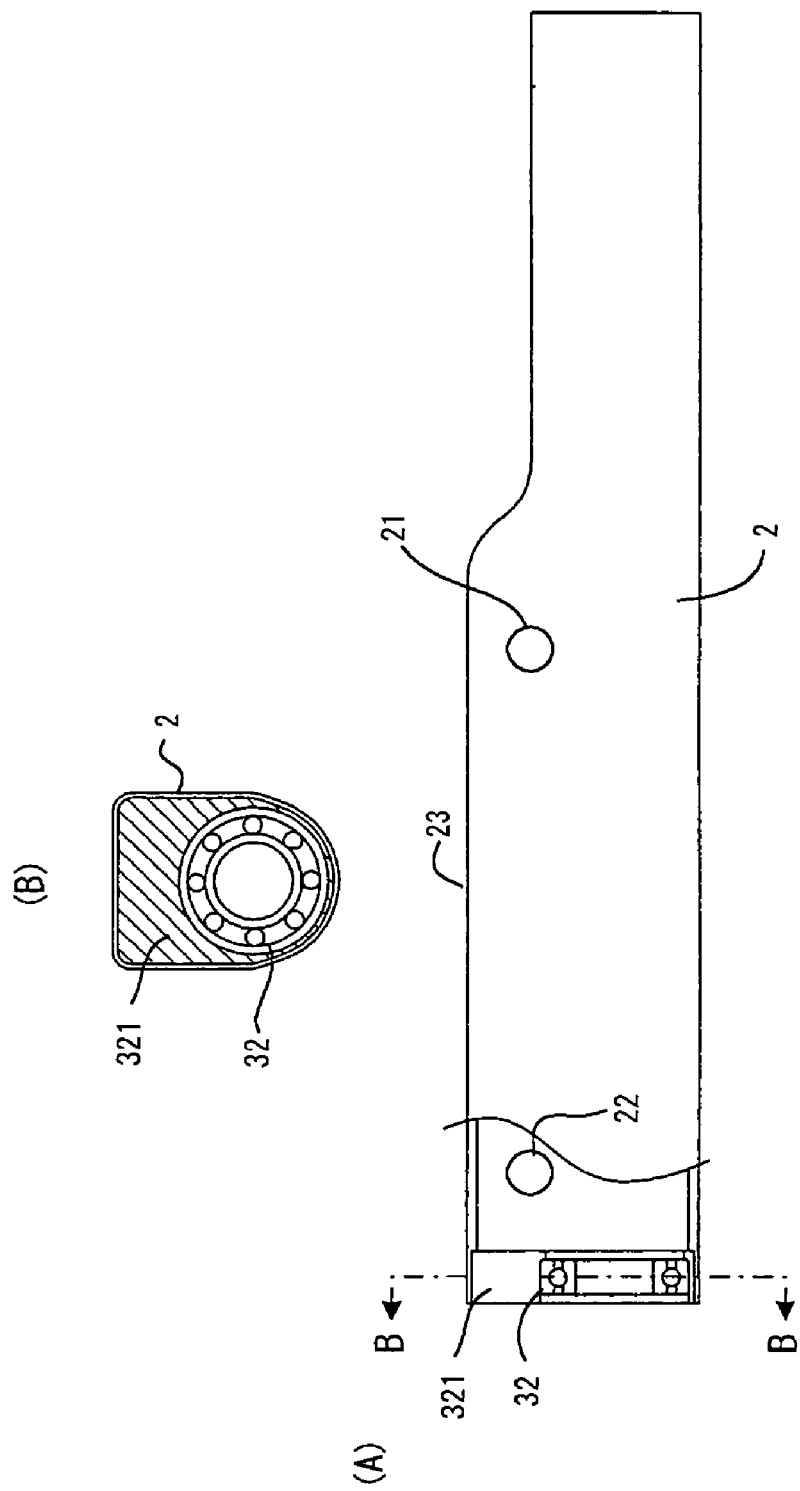
FIG. 3 is an explanatory diagram for explaining mainly the column body 2.

As understood from FIG. 2, the swelled shell part 23, being a part of the column body 2, is formed in a swelled manner more than the part where the upper bearing 31 is provided on the upper side of the steering shaft 3, having a deformed cross section with opposed walls being parallel to each other. The swelled shell part 23 is swelled smoothly from the part where the upper bearing 31 is provided. Since the swelled shell part 23 has a deformed cross section, geometric moment of inertia in the vertical direction (upright direction) is different from that of horizontal direction (side-to-side direction), and the vertical direction becomes more resistant to flexure than the horizontal direction, thereby enhancing the flexural rigidity in the vertical direction. By enhancing the flexural rigidity, the natural vibration frequency of this direction is also increased. Accordingly, resonance is suppressed both at an idle and at high speed operation, and thus it is possible to obtain a favorable steering operability.

It is to be noted that on the bottom edge of the column body 2, a bearing spacer 321 is provided so as to support the lower bearing 32 by narrowing the space between the lower bearing 32 and the swelled shell part 23. Any material can be employed for the bearing spacer 321, but it is preferable to use a resin or an elastic member such as rubber, which is favorable in vibration absorption, from a viewpoint of cost and vibration absorption property.

Furthermore, the upper body mounting part 21 and the lower body mounting part 22 are made from a part of the swelled shell part 23. Therefore, not only such steps are not required as fabricating a distance bracket 21d and a lower bracket 22t independently in advance and installing those elements onto the column body 2 by welding, as done in the conventional type steering column device 1, but also an issue of quality control as to welding is not necessary any more. Therefore, it is possible to reduce the product cost.

Figure 4:
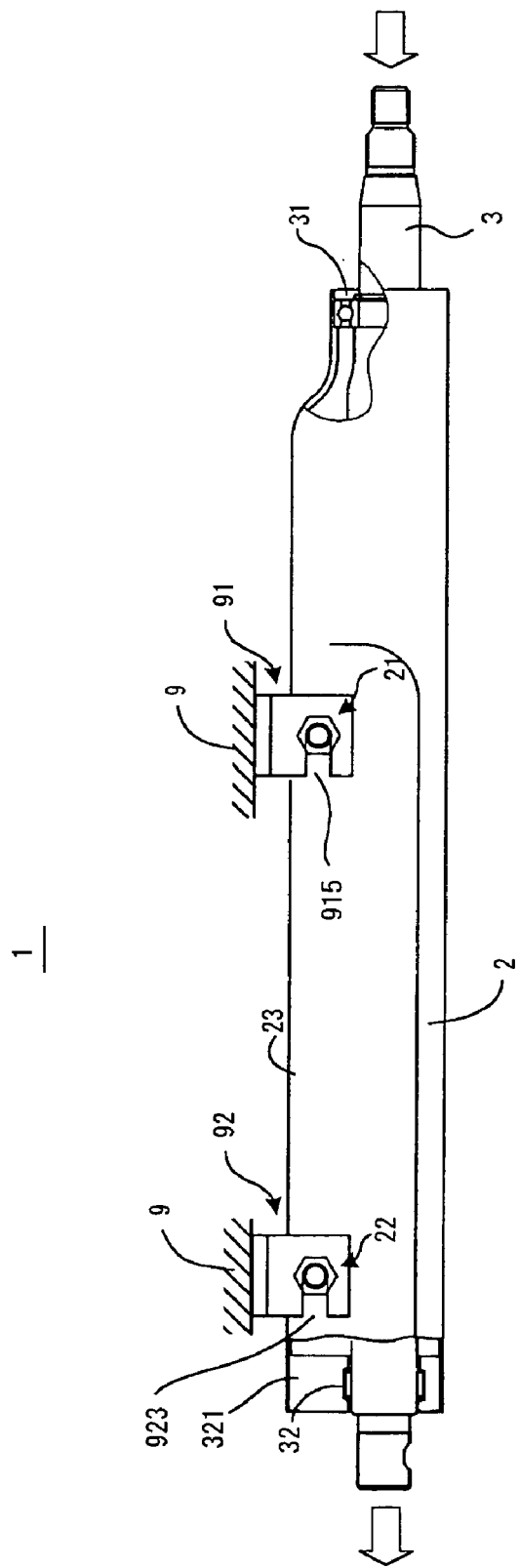
FIG. 4 is a side view showing a variation example of the steering column device 1 according to the present invention.

FIG. 4 is a side view showing a variation example of the steering column device 1 according to the present invention. In this example, the tilting function and the impact fracture member 913 in the steering column device 1 are omitted or simplified. The vehicle body side upper mounting part 91 is provided with a lateral open hole 915 as in the case of the vehicle body side lower mounting part 92. When an impact is applied, each bolt escapes from the lateral open hole 923 of the vehicle side lower mounting part 92 and from the lateral open hole 915 of the vehicle body side upper mounting part 91, thereby reducing the impact against the driver. As for the other structure of the present example, it is similar to the above example or obvious therefrom, redundant explanations will not be given.

Second Embodiment

Figure 5:
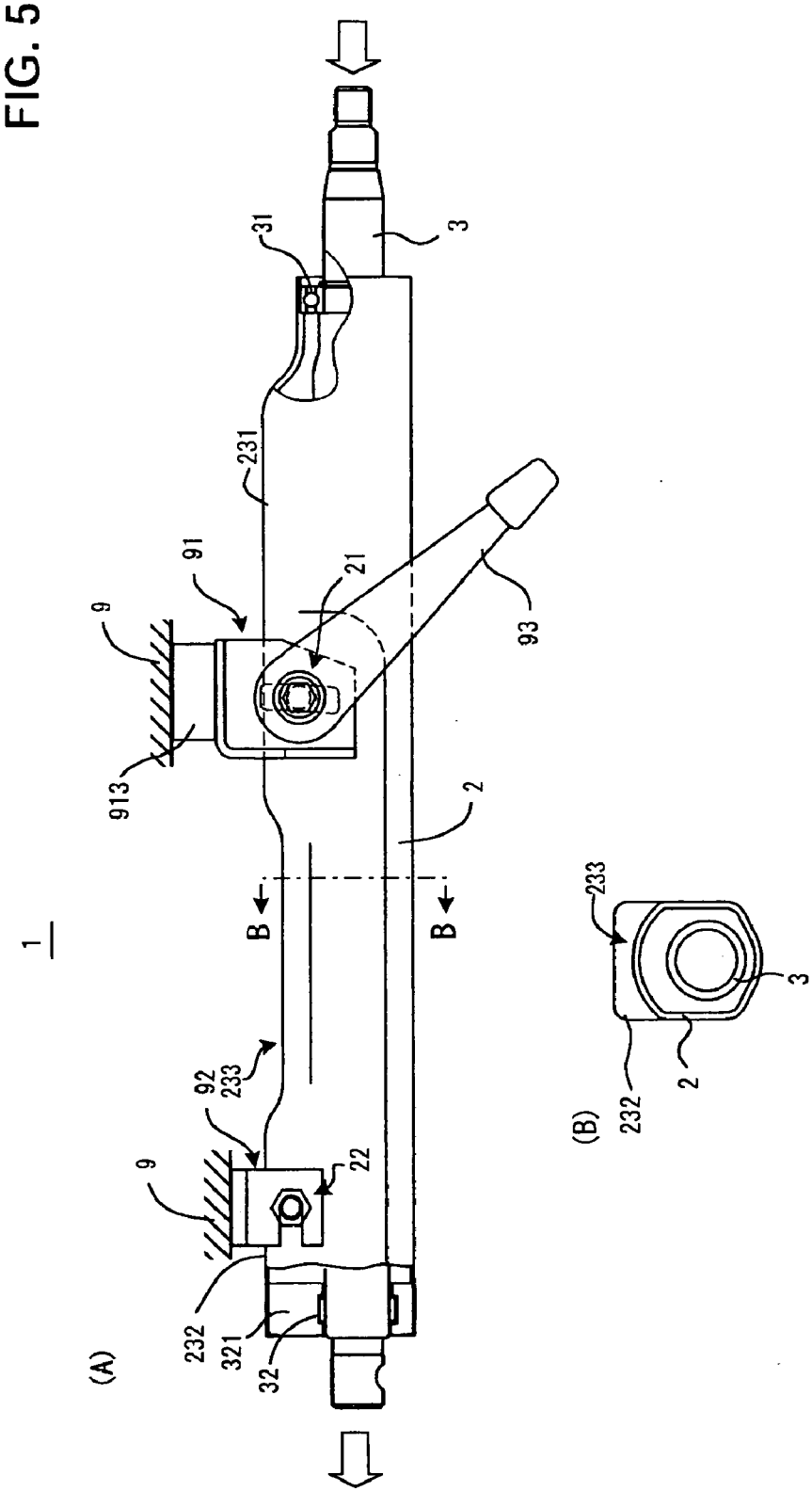
FIG. 5 is an explanatory diagram for explaining the steering column device 1 according to the second embodiment of the present invention.

FIG. 5 is an explanatory diagram for explaining the steering column device 1 according to the second embodiment of the present invention. In this figure, since the upper body mounting part 21, the lower body mounting part 22 and the cross section in proximity to the lower bearing 32 are similar to those in FIG. 2(B), FIG. 2(C) and FIG. 2(D), those figures can be referred to, if necessary.

Since the steering column device 1 as a whole has a structure in common with the first embodiment, the explanation thereof may be referred to. The swelled shell part 23 of the column body 2 in this example comprises separated two parts, an upper swelled shell part 231 including a portion in the proximity of the upper body mounting part 21, and a lower swelled shell part 232 including a portion in the proximity of the lower body mounting part 22, in such a manner as placing a constriction 233 therebetween. This constriction 233 can be formed in any shape freely to some extent, and thus rigidity and vibration property can be set appropriately as required, by adjusting a cross sectional shape and a length thereof in the direction of the steering shaft 3. Furthermore, it is effective to provide the constriction 233 in order to avoid interference with the vehicle body or other equipment.

Third Embodiment

Figure 6:
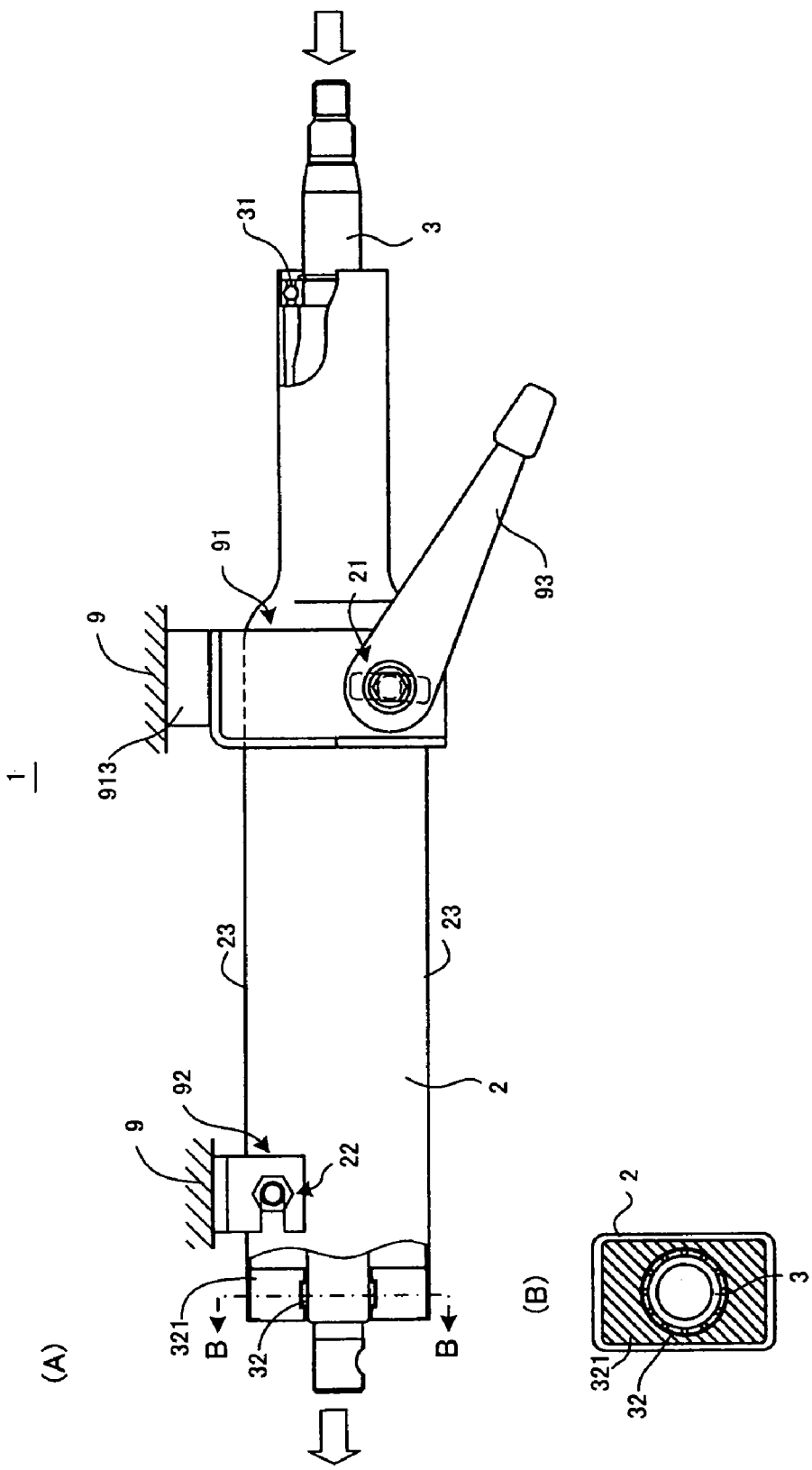
FIG. 6 is an explanatory diagram for explaining the steering column device 1 according to the third embodiment of the present invention.

FIG. 6 is an explanatory diagram for explaining the steering column device 1 according to the third embodiment of the present invention.

In this steering column device 1, the swelled shell part 23 of the column body 2 is swelled symmetrically, placing the steering shaft 3 therebetween. Further, an upper body mounting part 21 is provided on the downside of the swelled shell part 23 as shown in FIG. 6(A). In some vehicle structures, it is possible to give a degree of flexibility in arrangement of the steering column device 1 by providing the upper body mounting part 21 on the downside as shown in this example. Furthermore, the bearing spacer 321 is also symmetrically provided with respect to the lower bearing 32.

Since the column body 2 is vertically symmetrical, a flexure and the like hardly occur when a diameter of the tubular member is expanded, thereby bringing certain advantages such as facilitating a processing step.

Figure 7:
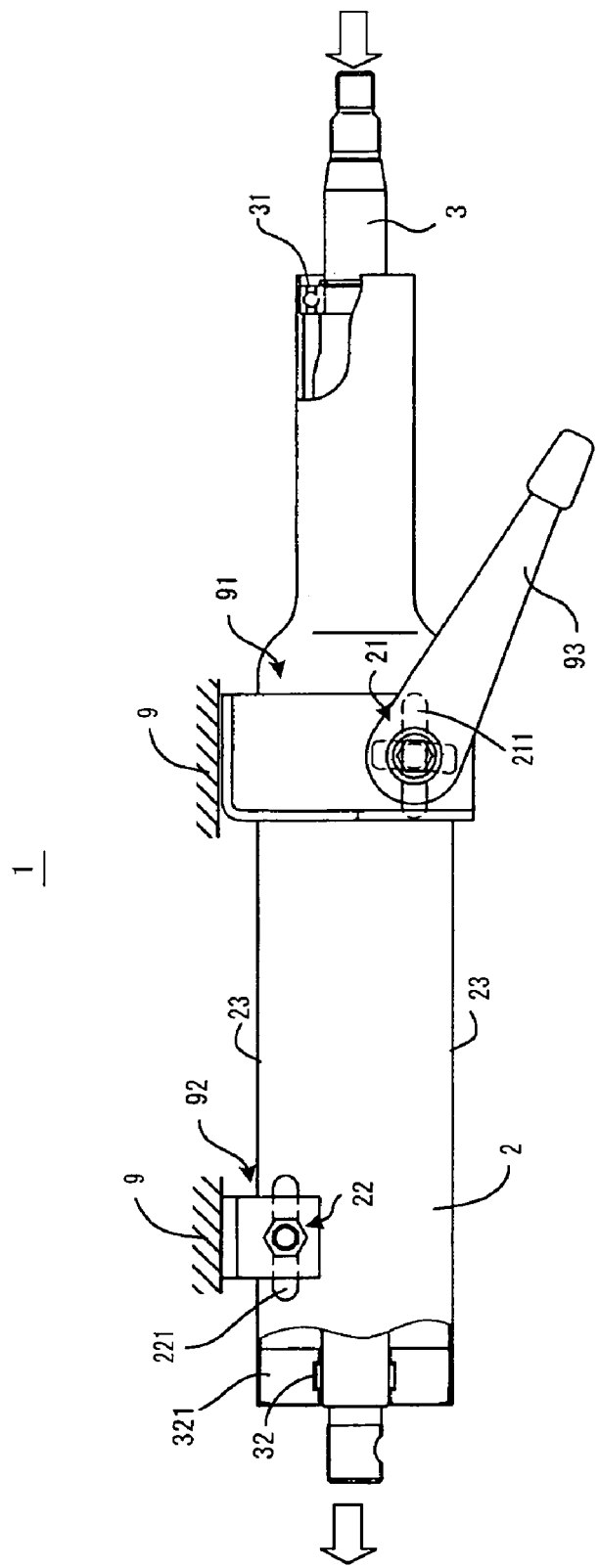
FIG. 7 is a side view showing a variation example of the steering column device 1 according to the third embodiment of the present invention.

FIG. 7 is a side view showing a variation example of the steering column device 1 according to the third embodiment of the present invention. In the examples described so far, the upper body mounting hole and the lower body mounting hole respectively provided on the upper body mounting part 21 and the lower body mounting part 22 are round shape. In the present embodiment, those holes are long holes 211 and 221 along the longitudinal direction of the column body 2. The vehicle body side upper holding shaft member 911 and the vehicle body side lower holding shaft member 921 penetrating into those holes respectively can move back and forth within the long holes 211 and 221 (in the direction along the steering shaft 3), whereby fore-and-aft position of the steering wheel can be adjusted.

Fourth Embodiment

Figure 8:
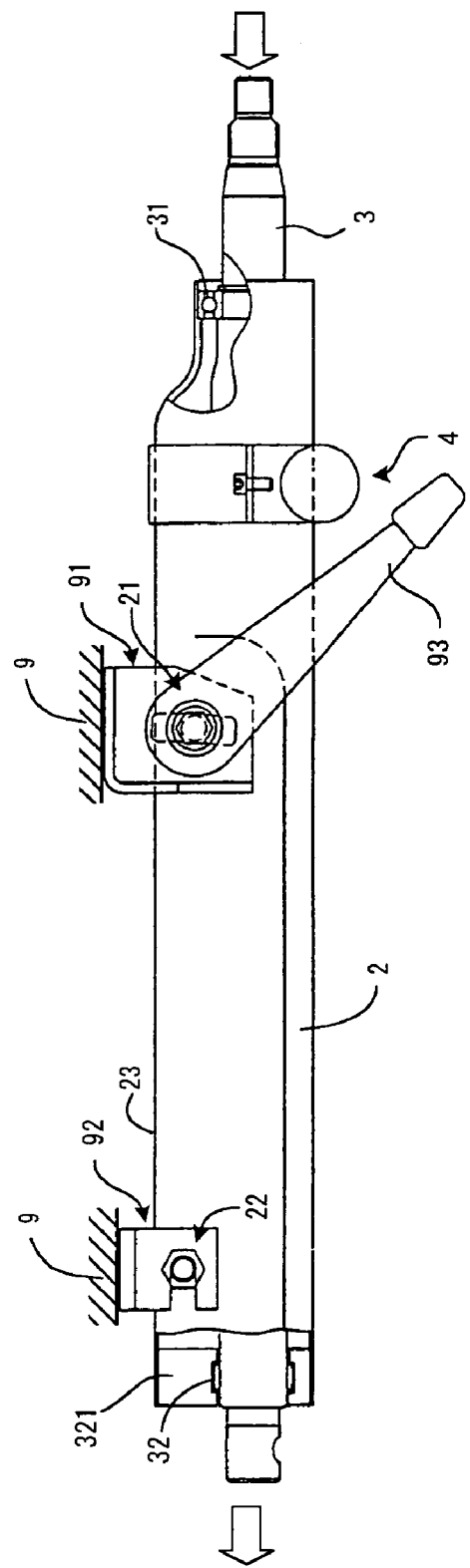
FIG. 8 is aside view of the steering column device 1 showing the forth embodiment of the present embodiment.
Figure 9:
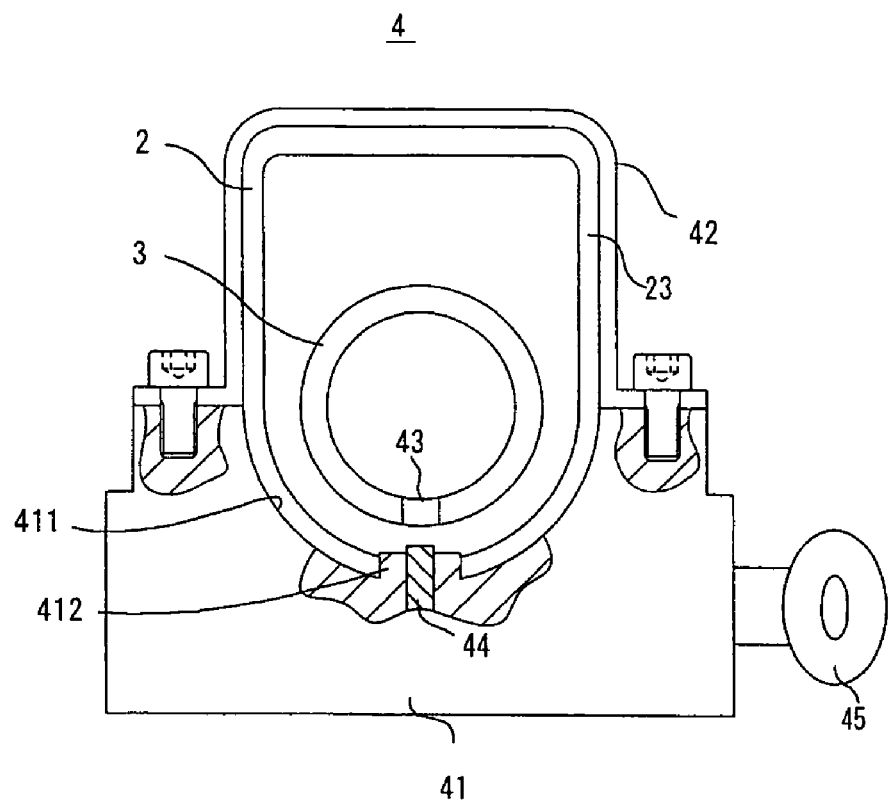
FIG. 9 is a cross section of essential portion as to the steering lock unit 4 in FIG. 8.

FIG. 8 is a front view of the steering column device 1 showing the forth embodiment of the present embodiment. This example relates to a type of steering column device 1 having a steering lock unit 4 mounted on the upper part thereof. The steering lock unit 4 is fixed on the swelled shell part 23, more preferably, on a position closer to the steering wheel side than the position of the upper body mounting part 21. FIG. 9 shows a cross section of essential portion as to the steering lock unit 4. The steering lock unit body 41 comprises a semicircle swivel plate 411 and an embossed portion 412 protruding therefrom. The swivel plate 411 has a shape corresponding to a lower half of the circle of the column body 2, and the embossed portion 412 has a dimension to be suitably fitted into an opening which is made on the column body 2 when assembled.

A fixed bracket 42 has an internal surface corresponding to the upper half of the swelled shell part 23, and this fixed bracket 42 and the steering lock unit main body 41 are clamped on the column body 2, in such a manner as holding the steering lock unit main body 41 therebetween. The steering lock unit main body 41 is secured onto the column body 2 in such a manner as being not rotatable, by the deformed shape of the swelled shell part 23 and the embossed portion 412.

In the center hole of the embossed portion 412, a lock pin 44 is accommodated movably in its own axial direction, and on the steering shaft 3, a lock long hole 43 is made at a position towards which the lock pin 44 is moved. When a key 45 is extracted, an upward urging force is given to the lock pin 44, by a means not illustrated. With this configuration, if the steering wheel is tried to be operated without the key 45, the lock pin 44 falls into the lock long hole 43, disabling the wheel operation, thereby preventing the vehicle from being stolen. Since rotation of the steering lock unit 4 is prevented by means of the swelled shell part 23, a problem such as applying a large torque to the embossed portion 412 enough to break it when someone tries to steal the vehicle, which has occurred conventionally, may not occur in the present invention.

In the case of steering column device 1 as described above, generally, natural vibration frequency of the steering column is relatively reduced due to the mass of the steering lock unit 4. Therefore, the natural vibration frequency of the steering column device 1 approaches to the vibration frequency of the vehicle body, whereby resonance may be easily established. In the present invention, as shown in the embodiments, the swelled shell part 23 is provided on the column body 2, whereby rigidity of the column body 2 is enhanced and the natural vibration frequency is increased. Accordingly, it is possible to prevent a resonance from occurring on the steering column device 1, due to the vibration from the vehicle body.

The lower half of the swelled shell part 23 is a circular form having a diameter equal to the conventional column body and it is not necessary to enlarge the width for enhancing rigidity. Therefore, a steering lock unit body 41, which is commonly employed these days, can be used as it is. The steering lock unit body 41 is generally made by aluminum die-cast. Since it is not necessary to newly create this die, the feature capable of enhancing the rigidity without increasing the width of the column body 2 brings a significant advantage. Since the fixed bracket 42 can be made of a plate material, even though it is newly created to fit to the upper half of the swelled shell part 23, it does not cause a particular cost increase.

Further Embodiments and Others

Figure 10:
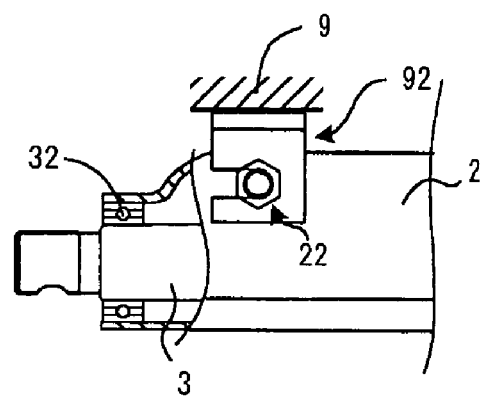
FIG. 10 is a partial cross sectional view showing a variation example of a bottom of the column body 2.

As to the column body 2, it is preferable that the swelled shell part 23 is formed by enlarging a diameter of the tubular member by hydroforming, but rubber bulging method, explosion bulging method, press forming or the like may be employed. In addition, the other way around, a tube having the same cross-sectional shape as the swelled shell part is prepared, and a part thereof is subjected to drawing processing or the like to reduce the diameter into a circular shape, so that the swelled shell part 23 and the like can be formed. In the embodiments as described so far, the swelled shell part 23 continues up to the bottom edge of the column body 2, and the bearing spacer 321 is provided to support the lower bearing 32. However, this structure is not necessarily required. As shown in FIG. 10, it may be also possible to reduce a diameter of the bottom edge of the column body 2 and to fix the lower bearing 32 directly thereon. In this case, firstly the swelled shell part is formed up to the bottom edge, and subsequently only the portion in the proximity of the bottom edge is deformed from the outside, thereby reducing the diameter, so that the internal diameter corresponds to the outer diameter of the lower bearing 32.

Holes on the column body 2, that is, holes of the upper body mounting part 21 and the lower body mounting part 22 (or long hole 211), and a hole into which the embossed portion 412 fits may be made by piercing in the course of hydroforming step for the column body. Alternatively, a separate step of laser processing may be prepared to make those holes.

INDUSTRIAL APPLICABILITY

As described above, according to the present invention, a step for fabricating a distance bracket and a lower bracket to be prepared independently, a welding step for fixedly positioning those brackets onto the column body, and a quality control therefor are not required any more, thereby reducing a product cost. Further in this steering column device, a swelled shell part of deformed cross section is provided on the column body, so that a flexural rigidity and vibration property are improved. In addition, in a type of steering column device having a steering lock unit being mounted on the upper portion thereof, a reduction of natural vibration frequency, which is relatively caused by the mass of the steering lock unit, can be suppressed by providing this swelled shell part, whereby it is possible to make resistant to resonance, without increasing weight of the steering column device or the column body, and thus a deterioration in steering operability can be prevented. Therefore, the steering column device relating to the present invention can make a contribution to the automobile industry.

The invention claimed is:

1. A steering column device comprising,
a column body being hollow,
an upper bearing and a lower bearing provided inside said column body,
a steering shaft being rotatably supported by said upper bearing and said lower bearing, having a steering wheel being mounted on the upper end thereof and a vehicle body steering mechanism being coupled with the lower end thereof,
a lower body mounting part formed in the lower part side of said column body so that said column body is supported in a tilted manner with respect to the vehicle body, and
an upper body mounting part formed in the upper part side of said column body so that said column body is supported in a tilted manner with respect to the vehicle body, characterized in that said column body has a shape more swelled laterally from said steering shaft than a portion where the upper bearing is provided, having a swelled shell part of deformed cross section with opposed walls parallel to each other, and said lower body mounting part and said upper body mounting part are formed on this swelled shell part.

2. The steering column device according to claim 1, characterized in that,
said swelled shell part has a shape smoothly swelled from a portion where the upper bearing is provided.

3. The steering column device according to claim 1, characterized in that,
said lower body mounting part and said upper body mounting part comprise lower body mounting holes and upper body mounting holes respectively, each on the opposed walls, allowing the holding shaft members on the vehicle body side to penetrate therein.

4. The steering column device according to claim 3, characterized in that,
said lower body mounting holes and said upper body mounting holes are long holes along the longitudinal direction of said column body.

5. The steering column device according to claim 1, characterized in that,
a steering lock unit is fixed on said swelled shell part.

6. The steering column device according to claim 5, characterized in that,
said steering lock unit is fixed closer to the steering wheel side than the upper body mounting part.

7. The steering column device according to claim 1, characterized in that,
said swelled shell part has a swelled portion from a position in the proximity of said lower body mounting part being continuous to a position in the proximity of said upper body mounting part.

8. The steering column device according to claim 1, characterized in that,
said swelled shell part has two separate portions, a lower swelled shell part including a portion in the proximity of said lower body mounting part and an upper swelled shell part including a portion in the proximity of said upper body mounting part.

9. The steering column device according to claim 1, characterized in that,
said lower bearing is provided on said swelled shell part and said lower bearing is provided on said swelled shell part via a spacer member.

10. The steering column device according to claim 9, characterized in that,
said spacer member is made of resin with a favorable vibrational absorption property or an elastic member such as rubber.

11. The steering column device according to claim 1, characterized in that,
said lower bearing is directly mounted on the bottom edge of said column body adjacent to said swelled shell part.

* * * * *